April 24, 1928.
H. C. STEWART
1,667,693
METHOD OF MAKING COPPERAS
Filed May 3, 1923
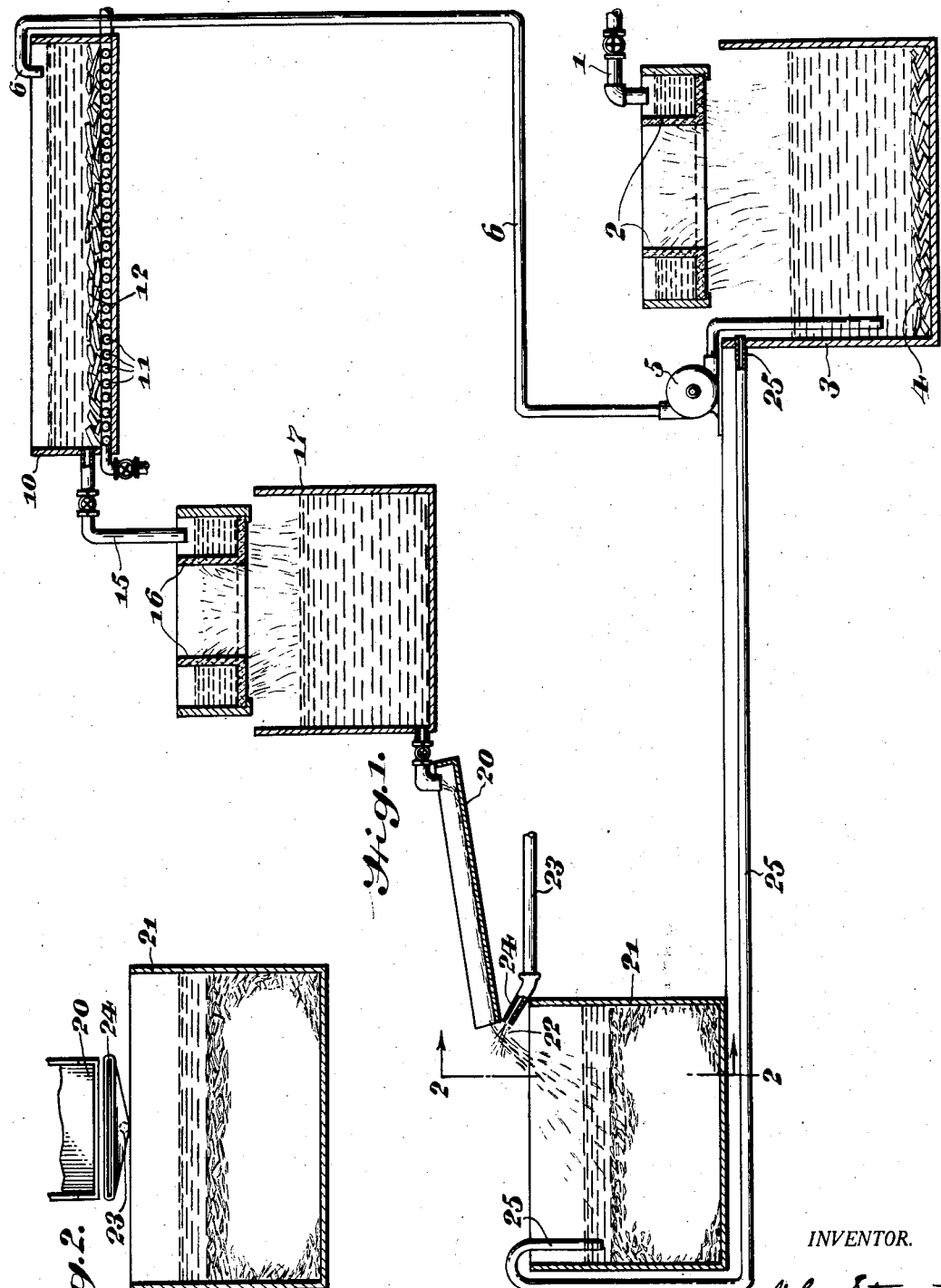
INVENTOR.
BY Henry Carlisle Stewart
Cyrus N. Anderson
ATTORNEY.

Patented Apr. 24, 1928.

1,667,693

UNITED STATES PATENT OFFICE.

HENRY CARLISLE STEWART, OF PHILADELPHIA, PENNSYLVANIA, ASSIGNOR TO THE WESTMORELAND CHEMICAL & COLOR COMPANY, OF PHILADELPHIA, PENNSYLVANIA, A CORPORATION OF PENNSYLVANIA.

METHOD OF MAKING COPPERAS.

Application filed May 3, 1923. Serial No. 636,487.

In the manufacture of copperas $(FeSO_4.7H_2O)$ one of the sources of supply of ferrous sulphate in solution consists of the "sludge" produced as a by-product or waste product resulting from the cleansing of scale from iron wire, rods, sheets, etc., produced by the placing of such iron wire, rods, sheets, etc., in tanks or vats containing a "pickling" liquor consisting of sulphuric acid and water. The scale is dissolved in and combines with the sulphuric acid to form what is known in the trade as "sludge", which contains ferrous sulphate and usually some free sulphuric acid. In practice it is desirable that the plant for the manufacture of copperas shall be situated in such proximity to such cleansing plant or apparatus that the "sludge" may be conducted directly to the apparatus employed in the manufacture of copperas. This "sludge" usually contains all sorts of impurities and foreign matter which should be removed. It is therefore one of the objects of my invention to provide a method of treatment of the "sludge" whereby impurities in solid form may be removed therefrom.

A further object of the invention is to provide a method of producing copperas whereby the production of a purer product than heretofore has been found to be commercially practicable may be effected.

A still further object of the invention is to provide a method which is more efficient and which may be practiced and carried out more economically than the methods heretofore employed.

A still further object is to provide a method whereby crystallization of the ferrous sulphate from its solution may be effected during transit or delivery into the crystallization tank or tanks.

Other objects and advantages of the invention will be pointed out in the detailed description thereof which follows or will be apparent from such description.

Although my invention is not dependent upon any particular character or construction of apparatus, I have shown in the accompanying drawing, for the sake of facilitating the description of the method and its operation, one form of apparatus which may be employed in the carrying out or practicing of the method.

In the said drawing:

Fig. 1 is a view in sectional elevation of an apparatus which may be employed in the carrying out of my invention; and Fig. 2 is a view in transverse section taken on the line 2—2 of Fig. 1.

Referring to the drawing: 1 designates a pipe or conduit by means of which the "sludge" is delivered into a filter 2 consisting or filtros (silica) bricks which are sufficiently porous to allow the liquid of the "sludge" to flow therethrough. Impurities in the form of solids, however, are retained within the filter and may afterwards be removed. This "sludge" is delivered from the filter 2 into a tank 3 which may contain scrap iron, as indicated at 4, which re-acts with any sulphuric acid which may be present. The solution is conducted from the tank 3 by means of a pump 5 and by line 6 to a tank 10 containing steam coils 11 therein by means of which the said solution, while in the said tank, may be boiled so as to concentrate the solution. This tank also contains scrap iron, as indicated at 12, which re-acts with any free sulphuric acid which may be present. After having been boiled to increase the concentration thereof from approximately 24° Baumé to 35° to 40° Baumé the solution is drawn off from the tank 10 through a valve controlled pipe 15, preferably though not necessarily, into a filter 16 similar to that at 2 and from the latter is discharged into a settling and cooling tank 17. The solution is allowed to remain in this tank for several hours until it has cooled. A certain amount of settling also takes place in this tank. After having settled and cooled the said solution is delivered into troughs, one of which is indicated at 20, from which it is discharged into a tank 21.

In order to effect crystallization of a large proportion of the ferrous sulphate from its solution the stream of the said solution, as it is discharged from the trough 20, is met by a stream of air, as indicated at 22, discharged from a pipe 23. The air is supplied by means of any suitable air pump, blower or compressor. The nozzle 24 from which the air is discharged should be of a width equal to the width of the stream of solution which is discharged from the trough 20. The said nozzle is also inclined so that the stream of air 22 discharged therefrom will travel in a direction transversely of the falling stream of the solution. As a result the air is thoroughly intermingled with the liquid stream, breaking it up into fine particles. By thus causing a stream of air to strike the stream of liquid and breaking the latter up as described, instantaneous crystallization of a large proportion of the ferrous sulphate is effected. The crystals produced are of needle-like formation. This product is known as "needle copperas".

After a tank has been charged the portion of the solution which has not been crystallized and which still remains in liquid form may be removed to another tank and further crystallization of the ferrous sulphate therefrom effected in the usual and well known manner. If preferred, however, the said remaining liquid portion of the solution may be returned by siphonic action through the pipe 25 to the tank 3 so that such solution may again pass through the cycle of treatment as hereinbefore described.

The copperas in the form of these needle crystals is removed from the tank and allowed to dry for a number of hours, say twenty-four hours, and is ready for shipment or for use.

Within a day or so after the removal of the needle crystals of copperas from the said tank these needles have become dry and assume the shape of small pellets. This has been found to be a form best suited for the subsequent treatment of the said copperas in the incinerating processes employed in the conversion thereof into iron oxide for use in the manufacture of paints or other products.

Having thus described my invention, what I claim and desire to secure by Letters Patent is:

1. The method of producing copperas from a solution of ferrous sulphate of a density of 35° to 40° Baumé, which comprises the discharge of said solution in the form of a stream and projecting a stream of air against and transversely of the said stream of solution to atomize and effect crystallization of the ferrous sulphate therein.

2. The method of producing copperas from a solution of ferrous sulphate of a density of 35° to 40° Baumé, which comprises the discharge of said solution of ferrous sulphate in the form of a wide thin stream and projecting a stream of air of substantially the same width against and transversely of said stream to atomize the same and effect crystallization of a portion of the ferrous sulphate held in solution.

3. The method of producing copperas from a solution of ferrous sulphate of a density of 35° to 40° Baumé, which comprises the discharge of a stream of said solution, discharging a stream of air against and transversely of the said stream to break the same up into small particles and thereby effect crystallization of a portion of the ferrous sulphate in solution, collecting the crystallized and uncrystallized portions within a tank, and thereafter separating the two.

4. The method of producing copperas, which comprises the filtration of a "sludge" containing ferrous sulphate in solution, thereafter boiling said solution to effect concentration thereof to a density of 35° to 40° Baumé, cooling the same, delivering the cooled solution into a conduit, discharging the same from said conduit in the form of a stream, and discharging a stream of air under pressure into the said stream of the solution to break the same up and effect crystallization of a portion of the ferrous sulphate therein.

In testimony that I claim the foregoing as my invention, I have hereunto signed my name this 1st day of May, A. D., 1923.

HENRY CARLISLE STEWART.